United States Patent
Delporte

(10) Patent No.: US 9,321,523 B2
(45) Date of Patent: Apr. 26, 2016

(54) METHOD AND DEVICE FOR AIDING THE CONTROL OF AN AIRCRAFT DURING A PARABOLIC FLIGHT IN ORDER TO GENERATE WEIGHTLESSNESS IN THE AIRCRAFT

(71) Applicant: AIRBUS OPERATIONS (SAS), Toulouse (FR)

(72) Inventor: Martin Delporte, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/482,513

(22) Filed: Sep. 10, 2014

(65) Prior Publication Data

US 2015/0076288 A1 Mar. 19, 2015

(30) Foreign Application Priority Data

Sep. 13, 2013 (FR) ...................................... 13 58829

(51) Int. Cl.
*B64C 13/04* (2006.01)
*G01C 23/00* (2006.01)
*G05D 1/06* (2006.01)

(52) U.S. Cl.
CPC ................ *B64C 13/04* (2013.01); *G01C 23/00* (2013.01); *G01C 23/005* (2013.01); *G05D 1/0607* (2013.01)

(58) Field of Classification Search
CPC ...... B64C 39/024; B64C 15/00; B64C 19/00; F42B 6/04; F42B 6/06; B60K 17/356; B60K 17/358; B60K 23/0808; B60K 7/0007; B60W 2550/148; B64G 7/00; E01C 23/088; E01C 23/127; F41B 5/14; G01D 21/02; G01H 17/00; G01P 3/665; G05D 1/0061; G05D 1/0088; G06F 17/5009; G06F 17/5018; G08G 5/04; G08G 5/045; Y02T 10/82
USPC ............... 701/11, 24, 69; 244/7 B, 46, 118.5; 700/91; 703/13; 473/151; 299/1.9; 102/502; 351/206; 359/295; 323/281; 73/12.05; 104/53
See application file for complete search history.

(56) References Cited

U.S. PATENT DOCUMENTS 5,003,305 A 3/1991 Kelly et al.
5,125,730 A * 6/1992 Taylor .................. A61B 3/1241
351/206

(Continued)

FOREIGN PATENT DOCUMENTS

FR 2 986 065 7/2013
FR 2 986 866 8/2013

OTHER PUBLICATIONS

Search Report for FR 15 58829 dated Jul. 9, 2014, 2 pages.

*Primary Examiner* — James Trammell
*Assistant Examiner* — Sanjeev Malhotra
(74) *Attorney, Agent, or Firm* — Nixon & Vanderhye P.C.

(57) ABSTRACT

A method and device are disclosed for aiding the control of an aircraft during a parabolic flight in order to generate weightlessness in the aircraft. The device includes a unit for automatically calculating a control stick order corresponding to a current optimum position of the control stick for carrying out a parabolic flight, a unit for automatically determining an actual position of the control stick, and a display unit for automatically displaying, on at least one scale that is displayed on a cockpit screen, simultaneously a first indicator corresponding to the control stick order and a second indicator corresponding to the actual position of the control stick.

10 Claims, 1 Drawing Sheet

(56) References Cited

U.S. PATENT DOCUMENTS

Figure 1:
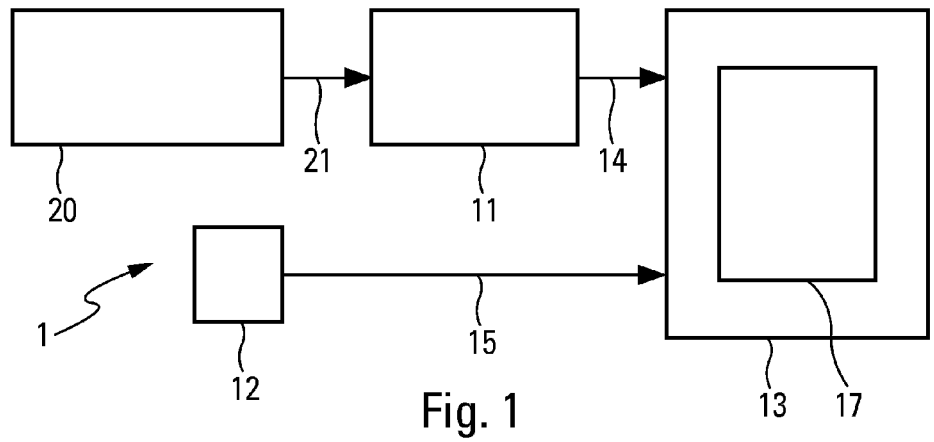

| | | | |
|---|---|---|---|
| 5,707,026 A | 1/1998 | Lefebvre et al. | |
| 5,971,319 A | 10/1999 | Lichtenberg | |
| 8,241,133 B1* | 8/2012 | Lewis | A63G 31/16 104/53 |
| 2003/0078762 A1* | 4/2003 | Hashima | G06F 17/5009 703/13 |
| 2004/0061917 A1* | 4/2004 | Mushika | G02B 3/0043 359/295 |
| 2005/0004723 A1* | 1/2005 | Duggan | G05D 1/0061 701/24 |
| 2006/0015236 A1* | 1/2006 | Yamaguchi | B60K 17/356 701/69 |
| 2007/0010342 A1* | 1/2007 | Sato | A63B 37/009 473/151 |
| 2007/0085518 A1* | 4/2007 | Buda | B23K 11/241 323/281 |
| 2008/0078875 A1* | 4/2008 | Diamandis | B64G 7/00 244/118.5 |
| 2010/0174425 A1* | 7/2010 | Dal Santo | G08G 5/045 701/11 |
| 2011/0202152 A1* | 8/2011 | Barton | F41B 5/14 700/91 |
| 2011/0226038 A1* | 9/2011 | Donahoe | F42B 6/04 73/12.05 |
| 2012/0085858 A1* | 4/2012 | Seifert | B64C 3/10 244/46 |
| 2012/0286102 A1* | 11/2012 | Sinha | B64C 15/00 244/7 B |
| 2014/0054949 A1* | 2/2014 | Berning | E01C 23/088 299/1.9 |
| 2014/0245918 A1* | 9/2014 | Scarr | F42B 10/36 102/502 |

* cited by examiner

METHOD AND DEVICE FOR AIDING THE CONTROL OF AN AIRCRAFT DURING A PARABOLIC FLIGHT IN ORDER TO GENERATE WEIGHTLESSNESS IN THE AIRCRAFT

This application claims priority to French Application No. FR 1358829 filed 13 Sep. 2013, the entire contents of which is hereby incorporated by reference.

The present invention relates to a method and to a device for assisting the piloting of an aircraft during a parabolic flight in order to generate weightlessness in the aircraft.

It is known that weightlessness corresponds to a weight-free situation and is the state of a body, in particular a human body, which is such that all the gravitational and inertial forces exerted thereon have both a resultant and a resultant moment of zero.

Since the beginnings of space travel, the need to recreate conditions of weightlessness has been met by producing specific flights for civil transport airplanes equipped for this purpose. Indeed, it is possible to obtain conditions of weightlessness inside an airliner, generally for around twenty seconds, by putting said airliner on a parabolic trajectory. This method has been used for several years for training astronauts, and also for the performance of scientific experiments requiring conditions of weightlessness.

Piloting an aircraft plane on this type of parabolic trajectory is a delicate operation basically on the pitch axis, the rolling axis being monitored solely in order to maintain zero inclination.

On the pitch axis, to help the pilot obtain the condition of weightlessness, he is generally provided with an indication relating to the vertical load factor. This vertical load factor is shown on a dedicated instrument by means of a linear scale provided with graduations, on which a point of cancellation of the load factor is marked.

If the load factor indicated is greater than 0, the pilot has to push on the control stick. If it is less than 0, the pilot has to pull on the control stick.

This technique is relatively effective and, with a well-trained crew, leads to satisfying results in most cases.

However, it has one drawback: on an airplane of standard architecture, that is to say equipped with a rear horizontal tail, the elevator has a direct effect that is the opposite to that desired by the pilot. If, for example, the pilot wants a low positive load factor, he will push on the control stick. This action has the effect of deflecting the elevator downward. This deflection of the elevator generates an increase in lift of the rear horizontal tail, the predominant effect of which is to create a nose-down moment at the centre of gravity. This moment generates negative pitch acceleration, incorporated into a negative pitching rate which is itself incorporated into a decrease in attitude, which triggers a decrease in incidence and thus finally a decrease in lift and thus in the load factor, which was the initial intention of the pilot. However, this decrease in load factor is obtained after double incorporation. One effect of the deflection of the elevator is weaker but more immediate: the increase in the lift of the horizontal tail in the example of a pilot pushing on the control stick causes a temporary increase in lift and thus in load factor on the airplane as a whole. Therefore, a pilot who pushes on the control stick to reduce the load factor will, temporarily, cause a slight yet visible increase in the load factor. The opposite effect occurs if the pilot pulls on his control stick if he wants to increase the load factor.

This indirect effect of the elevator has two main consequences on the quality of weightlessness achieved in the airplane:

a) the pilot will need to be well trained to be able to fly the aircraft using a kind of pre-command without worrying about the initial effect of his action on the control stick; and b) in the case of atmospheric disturbances, the pilot will attempt to compensate for fluctuations in the load factor which he sees on his indicator, not knowing whether they stem from an external effect or his own action. And each of his actions will impair the quality of weightlessness, in particular at the rear of the cabin.

An object of the present invention is to remedy this drawback. It relates to a method for assisting the piloting of an aircraft during a parabolic flight in order to generate weightlessness in the aircraft, which makes it possible to assist the pilot such that he knows at all times, directly and immediately, what action or order he has to apply to his control stick, and thus to minimise unwanted actions which impair the quality of weightlessness.

For this purpose, according to the invention, said method for assisting the piloting of an aircraft during a parabolic flight in order to generate weightlessness in the aircraft, said aircraft comprising a control stick capable of actuation by a pilot to alter its position and configured to act on at least one elevator so as to generate piloting of the aircraft on the pitch axis according to the position of said control stick, is distinctive in that it comprises a sequence of steps, carried out in an automatic and repeated manner, during a parabolic flight of the aircraft and consisting in real time in a) computing a control stick command corresponding to an optimum current position of the control stick for the parabolic flight;

b) determining an effective (that is to say, actual) current position of the control stick; and c) simultaneously showing, on at least one scale of control stick positions which is displayed on a screen of the cockpit:

a first indicator representing said control stick command computed in step a); and a second indicator representing said effective current position of the control stick, determined in step b).

Thus, owing to the invention, the control stick command (which shows an optimum position of the control stick to make the aircraft fly in a parabolic flight for creating weightlessness) is computed in real time and adapted to the current situation of the aircraft in flight. This control stick command is supplied to the pilot via the first indicator, which thus indicates to the pilot at any given time the position in which the control stick needs to be brought for optimum piloting of the aircraft. Since, as set out above, said control stick command depends solely on the speed and on the angle of pitch, it is virtually insensitive to atmospheric disturbances and does not depend on the quality of the load factor measurement.

Therefore, the present invention assists the pilot by directly indicating to him in real time what action he has to apply to his control stick for parabolic flight, thereby making it possible to minimise unwanted actions which impair the quality of weightlessness.

In a preferred embodiment, in step a), said control stick command C is computed on the basis of the following equation:

$$C = k0 + k1*\cos\theta/V + k2*\sin 2\theta/V^2$$

in which:

$\theta$ is a current angle of pitch of the aircraft;

V is a current speed of the aircraft; and k0, k1 and k2 are predetermined constants.

In this preferred embodiment, advantageously:
the angle of pitch of the aircraft is measured by means of at least one inertial sensor on board the aircraft; and
the speed of the aircraft is determined by means of at least one of the following onboard means:
at least one inertial sensor;
at least one receiver of a satellite positioning system; and
at least one pressure or temperature sensor.

Furthermore, in a preferred embodiment, in step c), the scale is displayed vertically and said first and second indicators are displayed on either side of this vertical scale.

Moreover, advantageously, said method comprises an additional step, which precedes step a) and consists in determining the constants k0, k1 and k2 by carrying out the following operations:
determining and recording, in real time, values for the angle of pitch of the aircraft, for the speed of the aircraft and for deflection of the control stick, over the course of at least one parabolic flight performed by means of at least one of the following operations: at least one simulation and/or at least one flight test; and
computing said constants k0, k1 and k2 on the basis of the values for the angle of pitch, for the speed and for deflection of the control stick, thus recorded.

The present invention also relates to a device for assisting the piloting of an aircraft during a parabolic flight of an aircraft in order to generate weightlessness in the aircraft.

According to the invention, said piloting assistance device is distinctive in that it comprises:
a computation unit configured for automatically computing a control stick command corresponding to an optimum current position of the control stick for parabolic flight;
a position determination unit configured to automatically determine an effective current position of the control stick; and
a display unit configured to show, on at least one scale of control stick positions which is displayed on a screen of the cockpit, automatically and simultaneously:
a first indicator representing said control stick command computed by said computation unit; and
a second indicator representing said effective current position of the control stick, determined by said position determination unit.

In a particular embodiment, said piloting assistance device additionally comprises a set of information sources, comprising at least one of the following information sources:
at least one inertial sensor;
at least one receiver of a satellite positioning system; and
at least one pressure or temperature sensor.

The present invention also relates to a system for manually piloting an aircraft, comprising a control stick capable of actuation by a pilot to alter its position and configured to act on at least one elevator so as to generate piloting of the aircraft on the pitch axis according to the position of said control stick, said manual pilot system additionally comprising a piloting assistance device of the aforesaid type.

The present invention further relates to an aircraft, in particular a transport airplane, which is provided with such a piloting assistance device and/or with such a manual pilot system.

The figures of the accompanying drawings will illustrate how to carry out the invention. In these figures, identical reference numerals denote similar elements.

FIG. 1 is a block diagram of a piloting assistance device which shows an embodiment of the invention.

Figure 2:
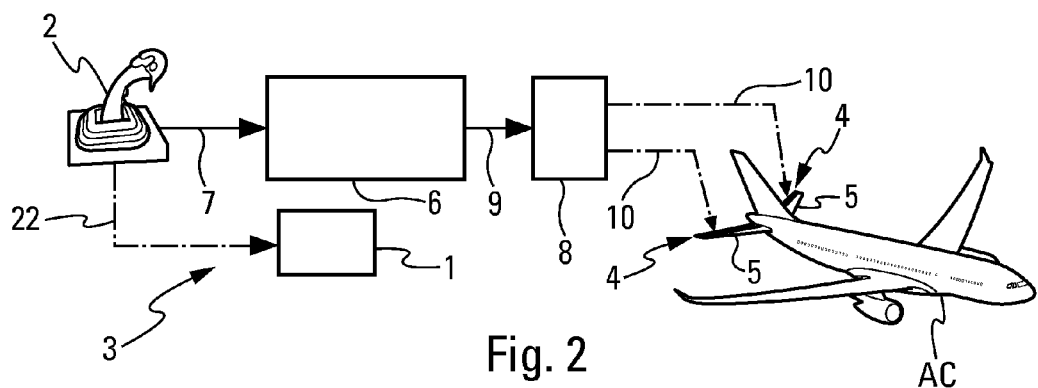

FIG. 2 schematically shows a manual pilot system comprising a piloting assistance device.

Figure 3:
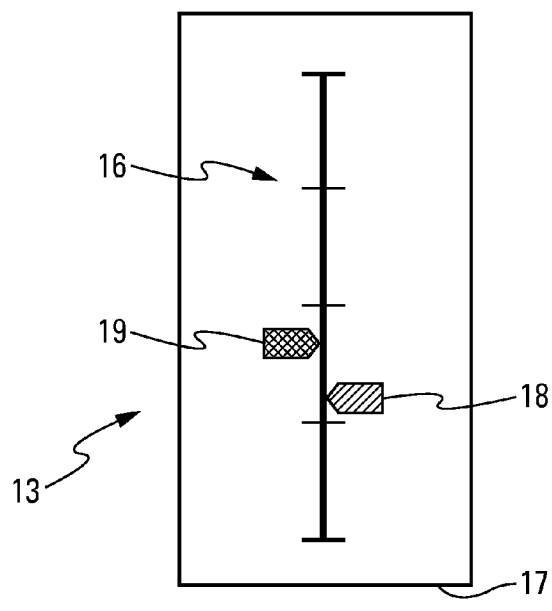

FIG. 3 schematically shows a sample display, capable of being produced by a piloting assistance device.

The device 1 shown schematically in FIG. 1. in illustration of the invention is intended to assist the piloting of an aircraft AC, in particular a civil transport airplane, during a parabolic flight in order to generate weightlessness in the aircraft AC.

"Parabolic flight" means flight during which the aircraft AC is brought onto a standard parabolic trajectory, which makes it possible to achieve weightlessness inside said aircraft AC for a certain duration, generally in the region of around twenty seconds. The method for computing the parabolic trajectory used to create conditions of weightlessness is known and no further details are given in the present description.

The present invention is applicable to a flight that is produced manually by a pilot by acting on a standard control stick 2 of the aircraft AC, belonging to a manual pilot system 3.

As shown schematically and very generally in FIG. 2, this manual pilot system 3 comprises:
the standard control stick 2 which is capable of actuation (by being moved (pivoted) either forwards or backwards) by a pilot to alter its position (that is to say its deflection) and configured to act on the elevators 4 of the aircraft AC, fitted to the horizontal tails 5 of the aircraft AC, with a view to generating piloting of the aircraft AC on the pitch axis;
a computer 6 which computes, in a conventional manner, according to the position of the control stick 2 (expressed by an angle of deflection) received by means of a link 7, a control signal transmitted via a link 9 to a set 8 of actuators associated with the elevators 4 of the aircraft AC; and
said elevators 4 are deflected by actuation of the associated actuators, as indicated schematically by arrows 10 shown as a dotted and dashed line in FIG. 2.

Although, in order to simplify the drawing, the pilot system 3 is shown outside the aircraft AC in this FIG. 2, it is of course on board the aircraft.

Within the scope of the present invention, the pilot system in question may correspond to an electric flight control system, as shown in FIG. 2, or to a mechanical flight control system.

According to the invention, said piloting assistance device 1, which is also on board the aircraft AC and belongs, for example, to the manual pilot system 3 (FIG. 2), comprises, as shown in FIG. 1:
a computation unit 11 configured to compute a control stick command C corresponding to an optimum current position of the control stick 2 for parabolic flight;
a standard position determination unit 12 configured for determining the effective (actual) current position of the control stick 2 (as shown by a link 22 in FIG. 2), the control stick command and the current position being expressed in the same unit, for example in degrees representing the angle of deflection of the control stick relative to a neutral position; and
a display unit 13 which is connected by means of a link 14 to the computation unit 11 and by means of a link 15 to the position determination unit 12.

The display unit 13 comprises at least one screen 17 installed in the cockpit of the aircraft AC and is configured for, on at least one scale 16 of control stick positions which is displayed on the screen 17, simultaneously showing, as shown in FIG. 3:

a first indicator 18 representing said control stick command computed by said computation unit 11; and a second indicator 19 representing said effective current position of the control stick, determined by said position determination unit 12.

In a preferred embodiment, shown in FIG. 3, the scale 16 is shown vertically, and the indicators 18 and 19 are displayed on either side of this vertical scale 16. Such a display is very intuitive and makes it possible to indicate directly to the pilot if he has to push or pull on the control stick 2. However, an alternative display of the indicators is also possible, for example with the two indicators displayed on the same side of the scale.

The indicators 18 and 19 are shown, for example, in the form of an arrow, a bar or any other graphical element, and have either identical or different shapes and/or colours. In addition, the scale 16 may be either graduated or not graduated.

Thus, owing to the invention, the control stick command (which shows an optimum position of the control stick 2 for flying the aircraft AC in a parabolic flight for creating weightlessness) is computed in real time and adapted to the current situation of the aircraft AC in flight. This control stick command is supplied to the pilot via the indicator 18, which thus indicates at any given time the position in which the control stick 2 needs to be brought for optimum piloting of the aircraft AC.

In addition, since, as set out above, said control stick command depends solely on the speed and on the angle of pitch, it is virtually insensitive to atmospheric disturbances and is not dependent on the quality of the load factor measurement. Therefore, the device 1 assists the pilot by directly indicating to him in real time what action he has to apply to his control stick 2 for parabolic flight, thus making it possible to minimise unwanted actions which impair the quality of weightlessness.

The device 1 also comprises a set 20 of information sources which provide information to the computation unit 11, via a link 21, and in particular current parameter values for the aircraft AC, in particular its speed and angle of pitch, as set out above.

In a preferred embodiment, the computation unit 11 comprises (incorporated and not shown) computation elements for computing said control stick command C, on the basis of the following equation:

$$C = k0 + k1 * \cos\theta / V + k2 * \sin 2\theta / V^2$$

in which:
θ is the current angle of pitch of the aircraft AC;
V is the current speed of the aircraft AC; and
k0, k1 and k2 are predetermined constants.

These constants k0, k1 and k2 depend on mass and aerodynamic properties of the aircraft AC, and on the kinematics between the position of the control stick 2 and the corresponding deflection of the elevators 4.

In this preferred embodiment:
the angle of pitch θ of the aircraft AC is measured, in a conventional manner, by means of at least one inertial sensor of the aircraft AC, which belongs to the set 21; and
the speed V of the aircraft AC is determined by means of at least one of the following onboard means, which also belong to the set 21:
at least one inertial sensor;
at least one receiver of a GPS satellite positioning system; and
at least one pressure or temperature sensor.

Thus, the speed can be obtained by inertial sensors. A GPS speed can also be used. If the ground speed is not available, it is also possible to use an aerodynamic speed obtained, in the conventional manner, on the basis of static and dynamic pressure measurements, and of the total temperature.

Within the scope of the present invention, the constants k0, k1 and k2 are determined in an experimental manner, either from simulation results, on the basis of a model of the dynamic behaviour of the aircraft, or from results of flight tests. It is, for example, possible to ask a trained pilot to fly the aircraft AC along a parabolic trajectory (such as that requiring implementation in order to obtain the desired conditions of weightlessness) by using, for example, a standard method of piloting acceleration, as is conventionally performed on the basis of a vertical acceleration measurement indicated to the pilot. The recordings performed during this flight test provide a specific evolution of the deflection of the control stick. On the basis of this curve, it suffices to adjust the coefficients k0, k1 and k2 for the command to optimally track the average position of the control stick 2. The value of the command is computed on the basis of the recorded values for the angle of pitch and speed of the aircraft over the course of this test.

Thus, to summarise, the constants k0, k1 and k2 can be determined by carrying out the following operations:
determining and recording, in real time, values for the angle of pitch of the aircraft, for the speed of the aircraft and for deflection of the control stick, over the course of at least one parabolic flight performed by means of at least one simulation and/or at least one flight test; and
computing said constants k0, k1 and k2 on the basis of the values for the angle of pitch, for the speed and for deflection of the control stick, thus recorded.

Therefore, the assistance provided to the pilot by the device 1 consists of an indication on the vertical scale 16 (via the indicator 18) of the optimum position of the control stick 2 to apply at any given time during flight along the parabolic trajectory. The effective current position of the control stick 2 is also shown (via the indicator 19) on the same scale 16. The piloting technique used by the pilot is thus very simple and consists in actuating the control stick 2 such that the indicator 19 of the current position of the control stick 2 arrives opposite (at the same height in the case of a vertical scale 16) the position of the indicator 18 supplying the command.

The invention claimed is:

1. A method for assisting the piloting of an aircraft during a parabolic flight in order to generate weightlessness in the aircraft, the aircraft comprising a control stick capable of actuation by a pilot to alter its position and configured to act on at least one elevator of the aircraft so as to generate piloting of the aircraft on the aircraft's pitch axis according to the position of the control stick, the method comprising a sequence of steps, carried out in an automatic and repeated manner, during a parabolic flight of the aircraft and consisting in real time in:

a) computing a control stick command corresponding to an optimum current position of the control stick for parabolic flight;

b) determining an effective current position of the control stick; and c) simultaneously showing, on at least one scale of control stick positions which is displayed on a screen of the cockpit:
(i) a first indicator representing the control stick command computed in step a);
(ii) a second indicator representing said effective current position of the control stick, determined in step b); and (iii) wherein in step a) the control stick command C is computed on the basis of the following equation:

$$C = k0 + k1*\cos\theta/V + k2*\sin 2\theta/V2$$

in which:
$\theta$ is a current angle of pitch of the aircraft;
V is a current speed of the aircraft; and
k0, k1 and k2 are predetermined constants.

2. The method according to claim 1, wherein the angle of pitch of the aircraft is measured by means of at least one inertial sensor on board the aircraft.

3. The method according to claim 1, wherein the speed of the aircraft is determined by means of at least one of the following onboard means:
at least one inertial sensor;
at least one receiver of a satellite positioning system; and
at least one pressure or temperature sensor.

4. The method according to claim 1, wherein in step c) the scale is displayed vertically and the first and second indicators are displayed on either side of this vertical scale.

5. The method according to claim 1, further comprising an additional step, which precedes step a) and consists in determining the constants k0, k1 and k2 by carrying out the following operations:
determining and recording, in real time, values for the angle of pitch of the aircraft, for the speed of the aircraft and for deflection of the control stick, over the course of at least one parabolic flight performed by means of at least one of the following operations: at least one simulation and/or at least one flight test; and
computing said constants k0, k1 and k2 on the basis of the values for the angle of pitch, for the speed and for deflection of the control stick, thus recorded.

6. A device for assisting the piloting of an aircraft during a parabolic flight of the aircraft to generate weightlessness in the aircraft, the device comprising:
a) a control stick capable of actuation by a pilot to alter its position and configured to act on at least one aircraft elevator so as to generate piloting of the aircraft on the aircraft pitch axis according to the position of the control stick;
b) a computation unit configured for automatically computing a control stick command corresponding to an optimum current position for parabolic flight;
c) a position determination unit configured to automatically determine an effective current position of the control stick;
d) a display unit configured to automatically show on the at least scale of control stick positions which is displayed on a screen of the cockpit, simultaneously:
(i) a first indicator representing the control stick command computed for the computation unit; and
(ii) a second indicator representing the effective current position of the control stick, determined by the position determination unit; and
e) wherein the computation unit is configured to automatically compute the control stick command C on the basis of the following equation:

$$C = k0 + k1*\cos\theta/V + k2*\sin 2\theta/V2$$

in which:
$\theta$ is a current angle of pitch of the aircraft;
V is a current speed of the aircraft; and
k0, k1 and k2 are predetermined constants.

7. The device according to claim 6 further comprising a set of information sources comprising at least one of the following information sources:
at least one inertial sensor;
at least one receiver of a satellite positioning system; and
at least one pressure or temperature sensor.

8. A system for manually piloting an aircraft, the system comprising:
a) a control stick capable of actuation by a pilot to alter its position and configured to act on at least one elevator so as to generate piloting of the aircraft on a pitch axis according to the position of the control stick; and
b) a piloting assistance device for assisting the piloting of the aircraft during a parabolic flight of the aircraft to generate weightless ness in the aircraft, the device comprising:
(i) a computation unit configured for automatically computing a control stick command corresponding to an optimum current position for parabolic flight;
(ii) a position determination unit configured to automatically determine an effective current position of the control stick; and
(iii) a display unit configured to automatically show on the at least scale of control stick positions which is displayed on a screen of the cockpit, simultaneously:
a first indicator representing the control stick command computed for the computation unit; and
a second indicator representing the effective current position of the control stick, determined by the position determination unit; and
(iv) the computation unit being configured to automatically compute said control stick command C on the basis of the following equation:

$$C = k0 + k1*\cos\theta/V + k2*\sin 2\theta/V2$$

in which:
$\theta$ is a current angle of pitch of the aircraft;
V is a current speed of the aircraft; and
k0, k1 and k2 are predetermined constants.

9. An aircraft comprising a piloting assistance device for assisting the piloting of an aircraft during a parabolic flight of the aircraft to generate weightlessness in the aircraft, the piloting assistance device comprising:
a) a control stick capable of actuation by a pilot to alter its position and configured to act on at least one elevator so as to generate piloting of the aircraft on the pitch axis according to the position of the control stick;
b) a computation unit configured for automatically computing a control stick command corresponding to an optimum current position for parabolic flight;
c) a position determination unit configured to automatically determine an effective current position of the control stick; and
d) a display unit configured to automatically show on the at least scale of control stick positions which is displayed on a screen of the cockpit, simultaneously:
(i) a first indicator representing the control stick command computed for the computation unit; and
(ii) a second indicator representing the effective current position of the control stick, determined by the position determination unit; and
e) the computation unit being configured to automatically compute said control stick command C on the basis of the following equation:

$$C = k0 + k1*\cos\theta/V + k2*\sin 2\theta/V2$$

in which:
$\theta$ is a current angle of pitch of the aircraft;
V is a current speed of the aircraft; and
k0, k1 and k2 are predetermined constants.

10. An aircraft comprising a manual pilot system comprising:
   a) a piloting assistance device for assisting the piloting of the aircraft during a parabolic flight of the aircraft to generate weightlessness in the aircraft, the piloting assistance device comprising:
      (i) a control stick capable of actuation by the pilot to alter its position and configured to act on at least one elevator so as to generate piloting of the aircraft on the pitch axis according to the position of the control stick,
      (ii) a computation unit configured for automatically computing a control stick command corresponding to an optimum current position for parabolic flight;
      (iii) a position determination unit configured to automatically determine an effective current position of the control stick; and
      (iv) a display unit configured to automatically show on the at least scale of control stick positions which is displayed on a screen of the cockpit, simultaneously:
         a first indicator representing the control stick command computed for the computation unit; and
         a second indicator representing the effective current position of the control stick, determined by the position determination unit; and
      (v) the computation unit being configured to automatically compute said control stick command C on the basis of the following equation:

$$C = k0 + k1*\cos\theta/V + k2*\sin 2\theta/V2$$

in which:
   $\theta$ is a current angle of pitch of the aircraft;
   V is a current speed of the aircraft; and
   k0, k1 and k2 are predetermined constants.

* * * * *